US012780351B2

(12) United States Patent
Hemsing et al.

(10) Patent No.: US 12,780,351 B2
(45) Date of Patent: Nov. 3, 2026

(54) ELECTRIC BICYCLE DRIVE UNIT FASTENING ASSEMBLY

(71) Applicant: SRAM, LLC, Chicago, IL (US)

(72) Inventors: Axel Hemsing, Neuss (DE); Kai Venhoff, Neuss (DE); Dietmar Greven, Neuss (DE)

(73) Assignee: SRAM, LLC, Chicago, IL (US)

(*) Notice: Subject to any disclaimer, the term of this patent is extended or adjusted under 35 U.S.C. 154(b) by 373 days.

(21) Appl. No.: 18/462,744

(22) Filed: Sep. 7, 2023

(65) Prior Publication Data

US 2023/0415849 A1 Dec. 28, 2023

Related U.S. Application Data

(63) Continuation of application No. PCT/EP2021/056354, filed on Mar. 12, 2021.

(51) Int. Cl.
*B62M 6/55* (2010.01)

(52) U.S. Cl.
CPC .................................... *B62M 6/55* (2013.01)

(58) Field of Classification Search
CPC ................................ B62M 6/55; B62K 19/34
See application file for complete search history.

(56) References Cited

U.S. PATENT DOCUMENTS

2017/0314593 A1* 11/2017 Mano .................... B62K 11/04
2019/0039677 A1* 2/2019 Noda ...................... B62M 6/90

FOREIGN PATENT DOCUMENTS

| | | |
|---|---|---|
| DE | 102016112778 | 1/2017 |
| DE | 102016115681 | 3/2017 |
| DE | 102017201617 | 8/2018 |
| EP | 3239029 | 11/2017 |

* cited by examiner

*Primary Examiner* — Minnah L Seoh
*Assistant Examiner* — Al-Birr Rahman Chowdhury

(57) ABSTRACT

An electric bicycle drive unit mounting arrangement for attaching an electric drive unit at a drive receptacle of a bicycle frame is provided. The bicycle frame has a fixed bearing fastening frame leg and a parallel loose bearing frame leg. A drive unit housing has a fixed bearing housing flange and a parallel loose bearing housing flange. The fixed bearing housing flange is frictionally attached directly against the fixed bearing frame leg. A loose bearing fastening element attaches the loose bearing housing flange to the loose bearing frame leg. The loose bearing fastening element is a loose bearing threaded bolt having a cylindrical bolt head seated in a loose bearing cylinder bore of the loose bearing frame leg without radial play, and has a threaded portion with an external thread screwed in a corresponding internal thread to the loose bearing frame leg or to one of the housing flanges.

14 Claims, 2 Drawing Sheets

ELECTRIC BICYCLE DRIVE UNIT FASTENING ASSEMBLY

This application is a continuation of, and claims the benefit of, International Patent Application No. PCT/EP2021/056354, filed Mar. 12, 2021, which is hereby incorporated by reference in its entirety.

BACKGROUND

The invention refers to an electric bicycle drive unit mounting arrangement for attaching an electric bicycle drive unit to the bicycle frame of the electric bicycle.

In the present case, an electric bicycle is understood to be any type of bicycle that comprises an assisting electric drive unit that adds a corresponding electric drive power to the human drive power input to the pedal crank by a rider, if desired. In particular, the present invention refers to a mounting arrangement for so-called mid-motor drive units that both rotatably support the pedal crankshaft and comprise an output element, for example at least one sprocket that drives a wheel of the electric bicycle. Particularly in such mid-motor drive units, very high mechanical forces can be applied to the drive unit for a short time, which are transmitted to the bicycle frame by the mounting arrangement.

The manufacturer of electric bicycle drive units is usually not identical with the manufacturer of the electric bicycle in which the drive unit is integrated. For this reason, electric bicycle drive units are generally constructed mechanically as essentially independent modules, so that only a relatively simple mechanical mounting arrangement is specified for their integration into a bicycle frame.

A mounting arrangement that comprises two frame legs extending in the longitudinal direction of the bicycle and extending in a vertical plane, which are arranged at a distance from one another in the transverse direction, has proven effective here. Between the two frame legs, two corresponding housing flanges of the drive unit are provided, which are attached to the frame legs by means of a number of bolts and screws inserted in corresponding openings and bores in the transverse direction. When the drive unit is mounted on the bicycle frame, the fixed bearing housing flange is first attached to the inside of the corresponding fixed bearing fastening frame leg in such a way that the fixed bearing frame leg is in direct and frictional contact with the fixed bearing housing flange. Since the manufacturers of the drive units on the one hand and of the bicycle frames on the other are generally not identical, there is in practice a tolerance gap due to manufacturing tolerances between the loose bearing housing flange and the corresponding loose bearing housing flange, which must be compensated for when mounting the loose bearing housing flange on the loose bearing frame leg.

Several mounting arrangements that compensate for tolerance gaps are known from DE 10 2016 112 778 A1. In one of these mounting arrangements, a threaded sleeve which can be displaced in the transverse direction of the bicycle is inserted in a transverse bore of the loose bearing housing flange and into which a threaded screw inserted from the distal direction through a corresponding opening in the loose bearing frame leg is screwed, thereby drawing the threaded sleeve into the tolerance gap until the threaded sleeve abuts against the inside of the loose bearing frame leg. Thus, two separate components are required for the implementation of this loose bearing attachment, namely the displaceable threaded sleeve and the corresponding threaded screw.

Against this background, the object of the invention is to provide a simplified electric bicycle drive unit mounting arrangement.

SUMMARY

This object is solved according to the present invention with an electric bicycle drive unit mounting arrangement with the features of claim 1.

The mounting arrangement comprises at a bicycle frame at least one fixed bearing fastening frame leg, which is preferably configured integrally with the bicycle frame, and at least one loose bearing fastening frame leg parallel thereto, which is preferably configured integrally with a drive unit housing. The drive unit housing, in which the electric traction motor is arranged, comprises at least one fixed bearing housing flange and at least one loose bearing housing flange parallel thereto, wherein the two housing flanges are in vertical parallel planes relative to the two frame legs. The fixed bearing housing flange is in direct contact with the fixed bearing frame leg and is frictionally connected thereto by one or more fixed bearing fastening elements. In the present case, a frictional connection is defined as direct contact between the fixed bearing housing flange and the fixed bearing frame leg, which ideally also transmits very high forces occurring parallel to and in the contact plane. In an upright bicycle frame, the base planes of the frame leg and the housing flange are approximately in vertical planes.

For attaching the loose bearing housing flange to the loose bearing frame leg, at least one special loose bearing fastening element is provided which is suitable for bridging a tolerance gap of various sizes between the loose bearing housing flange and the loose bearing frame leg, which is unavoidable in practice, reliably and with high mechanical strength.

For this purpose, the loose bearing fastening element is configured as a loose bearing threaded bolt which comprises a cylindrical bolt head seated without radial play in a corresponding loose bearing cylinder bore of the loose bearing frame leg. The bolt head is thus seated in the loose bearing cylinder bore without radial play and preferably with a tight fit, wherein the bolt head can, however, be rotated with the aid of a corresponding rotary wrench. The loose bearing threaded bolt further comprises a threaded section with an external thread, which is screwed into a corresponding internal thread at the fixed bearing frame leg or at one of the two housing flanges.

When the drive unit is mounted to the bicycle frame, the internal thread is first aligned coaxially with the loose bearing cylinder bore, whereupon the loose bearing threaded bolt is inserted from distally transversely proximally into the loose bearing cylinder bore of the loose bearing frame leg so that the threaded bolt external thread of the threaded section engages the corresponding internal thread. The loose bearing threaded bolt is then screwed into the corresponding internal thread with the aid of the rotary wrench, drawing the threaded bolt head into the corresponding loose bearing cylinder bore. As soon as the loose bearing threaded bolt reaches its end position, for example by resting the bolt head against the loose bearing housing flange, the loose bearing connection is established.

In the present case, the term "loose bearing" always refers to the side of the mounting arrangement in the assembled state in which the housing flange and the frame leg have no significant frictional connection with respect to forces in the vertical plane or in the planes of the loose bearing housing flange or the loose bearing frame leg, respectively, compared to the fixed bearing side.

The loose bearing connection between the loose bearing frame leg and the loose bearing housing flange can thus be provided by a single one-piece loose bearing fastening element which efficiently bridges the tolerance gap, thereby providing a strong connection, in particular with respect to vertical transmission forces, which transmits the large static and dynamic forces applied to the drive unit, in particular via the pedal crankshaft, even in the case of a high driver weight.

Preferably, the internal thread to which the threaded bolt section is screwed is associated with or provided in the fixed bearing frame leg. The loose bearing threaded bolt thus penetrates both housing flanges and both frame legs, and presses the two housing flanges and the fixed bearing frame leg together in a sandwich-like manner. The loose bearing threaded bolt ensures that the fixed bearing housing flange is pressed force-fit onto the associated fixed bearing frame leg, so that a force-fit connection is established between the fixed bearing frame leg and the fixed bearing housing flange. The loose bearing threaded bolt establishes both the loose bearing fastening and the opposite fixed bearing fastening. In this way, only a single fastening element and only a single assembly step are required to provide both the fixed bearing fastening and the opposing loose bearing fastening, thereby reducing manufacturing costs and assembly effort.

According to a preferred embodiment, a separate threaded nut is non-rotatably mounted to the fixed bearing frame leg and comprises the internal thread associated with the fixed bearing frame leg. The internal thread associated with the fixed bearing frame leg is thus not directly defined by the fixed bearing frame leg body, but is instead defined by a separate threaded nut which is, for example, non-rotatably beared in a correspondingly complementarily shaped recess in the fixed bearing frame leg. The threaded nut can be provided in the required material quality and precision by the drive unit manufacturer, so that the drive unit manufacturer has control over the quality of this connection.

Preferably, the two housing flanges each comprise a threadless insertion bore through which a bolt shaft of the loose bearing threaded bolt is inserted. During assembly, the loose bearing threaded bolt threaded section is thus inserted through the two threadless insertion bores to finally be screwed into the corresponding internal thread on the fixed bearing frame leg.

More preferably, the two housing flanges lie with their proximal sides directly against each other, so that the two housing halves of the drive unit housing, one housing half of which comprises the fixed bearing housing flange and the other housing half of which comprises the loose bearing housing flange, are also pressed against each other by the loose bearing threaded bolt and are connected to each other in this way.

Preferably, the outer diameter of the bolt head is considerably larger than the outer diameter of the threaded portion, wherein the proximal bolt head annular step formed thereby between the bolt head and the bolt shaft or the threaded portion abuts directly and with frictional connection against an opening edge of the loose bearing housing flange.

According to a preferred alternative embodiment, the internal thread corresponding to the threaded bolt portion is not provided at the fixed bearing frame leg, but is provided at the corresponding loose bearing housing flange. The internal thread is more preferably provided directly in the loose bearing housing flange body. It is more preferably provided that the fixed bearing housing flange is attached to the corresponding fixed bearing frame leg by a separate threaded screw.

Generally, respectively a single fixed bearing frame leg, loose bearing frame leg, fixed bearing housing flange and loose bearing housing flange can be provided. The frame legs and housing flanges may each be connected to each other by a plurality of fasteners. However, a plurality of individual fixed bearing frame legs, loose bearing frame legs, fixed bearing housing flanges, and/or loose bearing housing flanges may be provided, respectively. The fixed bearing frame leg(s) and the loose bearing frame leg(s) do not necessarily have to be aligned with each other, viewed in the transverse direction of the bicycle, but can also be arranged offset from each other.

Preferably, it is provided that the cylindrical bolt head comprises a tool-receiving structure for attaching a rotary wrench, which is preferably configured as an internal polygon.

According to a preferred embodiment, the drive unit is configured as a center motor, supports a pedal crankshaft and supports an output element, for example at least one sprocket, arranged outside of the drive housing. The pedal crankshaft is arranged transversely to the longitudinal axis of the bicycle frame and holds a crank arm at each side, at the ends of which a pedal is arranged respectively. The drive unit comprises an electric traction motor which drives the output element.

Preferably, the output element is arranged distally of the fixed bearing fastening frame leg. Thus, the output element is placed closer to the fixed bearing frame leg than to the loose bearing frame leg. This ensures that the forces induced by the output element and lying in the longitudinal plane of the bicycle frame are transmitted mainly by the frictional connection between the fixed bearing frame leg and the fixed bearing housing flange, and are transmitted to a much lesser extent by the opposite loose bearing.

BRIEF DESCRIPTION OF THE DRAWINGS

In the following, two embodiments of the invention are explained in more detail with reference to the drawings. They show:

FIGS. 1 and 2 respectively show an electric center motor drive unit 20 mounted at a bicycle frame 12 of a pedelec electric bicycle, which is not further shown.

DETAILED DESCRIPTION

Figure 1:
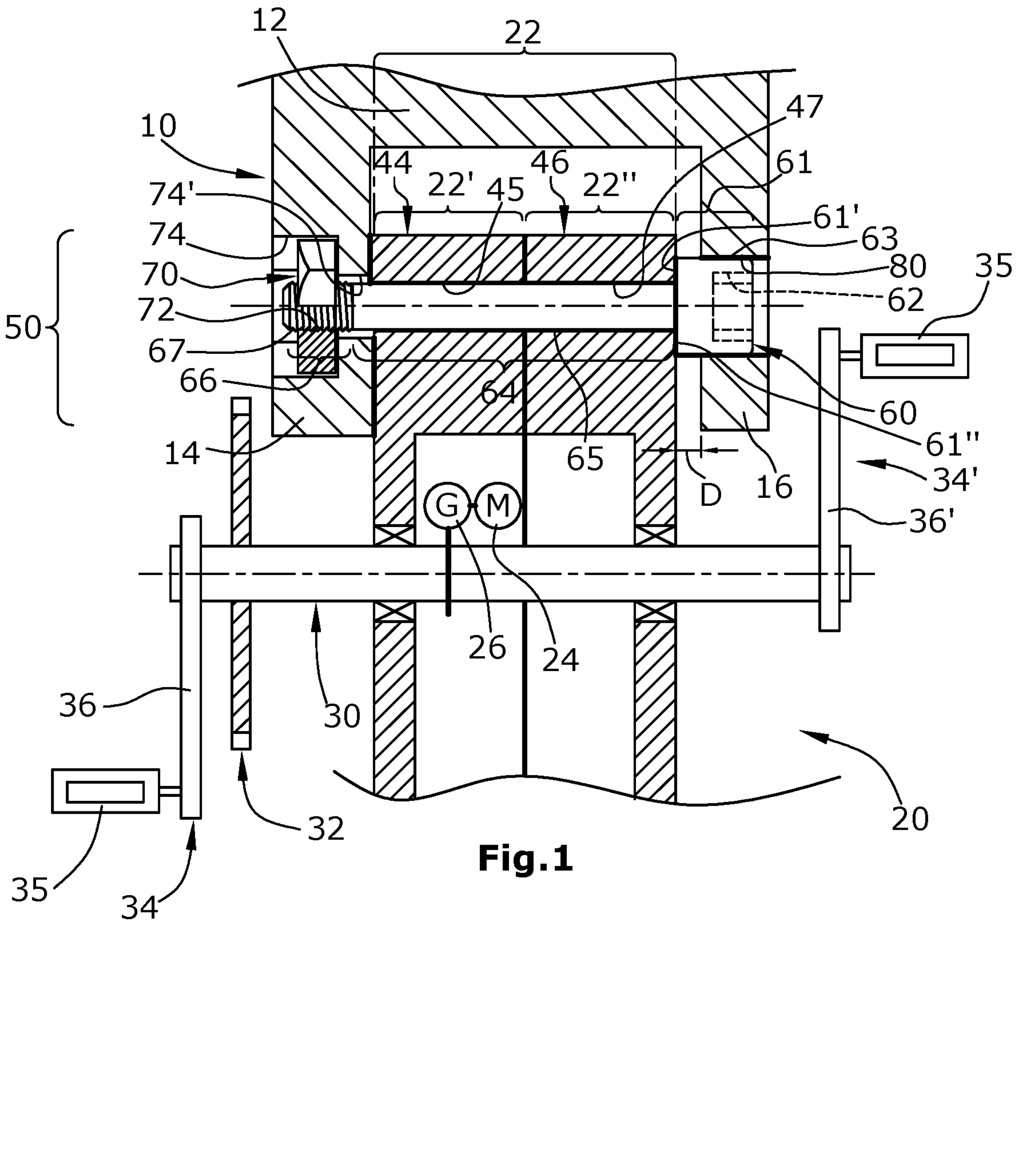
FIG. 1 a schematic cross-section of a first embodiment of an electric bicycle drive unit mounting arrangement comprising a single loose bearing threaded bolt defining both the loose bearing connection and the fixed bearing connection.

The drive unit 20 has a bearing for a transversely oriented pedal crankshaft 30, which comprises at its lateral shaft ends a pedal crank 36, 36', respectively, to the longitudinal ends of which a respective pedal pad 35 is attached. The pedal crankshaft 30 also carries an output element 32 lying in a longitudinal plane, which in the present case is configured as a sprocket by means of which a drive chain is driven, which drives a rear wheel sprocket. In the present case, the pedal crankshaft 30 also defines the output shaft, since also the electric traction motor 24 directly drives the pedal crankshaft 30 via a drive gear 26. However, the drive unit 20 can also be configured otherwise: for example, the bottom bracket shaft can be configured separately from an output shaft that drives the output element 32. The drive unit 20 comprises a housing 22; 122 in which the traction motor 24 and the drive gear 26 are respectively arranged, whereas the output element 32 is arranged outside of the housing 22; 122.

The housing 22; 122 is essentially composed of two housing halves 22', 22"; 122', 122", respectively, which configure a left or fixed bearing fastening side housing half 22'; 122', as viewed in the direction of travel, and a right or loose bearing side housing half 22"; 122". A housing half in the present case is not to be understood as defining exactly or approximately half of the respective housing 22; 122, respectively, but can also be, for example, a housing pot on the one hand and a housing cover on the other hand.

The drive unit 20 is respectively attached to the bicycle frame 12 by a mounting arrangement 50; 150. For this purpose, the bicycle frame 12 comprises a drive receptacle 10, respectively, to which the drive unit 20 is attached by suitable fastening means.

The drive receptacle 10 is substantially defined by two frame legs 14, 16 of the bicycle frame 12 lying in a longitudinal plane, which are spaced apart in the transverse direction and arranged parallel to one another, and which are configured integrally with the bicycle frame 12. The two frame legs 14, 16 and the bicycle frame 12 define a receiving frame which is U-shaped in cross-section and into which two corresponding housing flanges 44, 46; 144, 146 of the housing 22; 122 are inserted at the inside. In the two embodiments, the left frame leg 14 and the left housing flange 44; 144 together define a fixed bearing, respectively, and the right frame leg 16 and the right housing flange 46; 146 together define a loose bearing, respectively.

In the first embodiment of the mounting arrangement 50 shown in FIG. 1, the two housing flanges 44; 46 each extend transversely across the entire width of the drive housing 22, such that the two housing flanges 44; 46 are in direct contact with each other.

The loose bearing frame leg 16 comprises a continuous cylindrical loose bearing cylinder bore 80. The two housing flanges 44, 46 respectively comprise a continuous and unthreaded insertion bore 45, 47. The fixed bearing frame leg 14 comprises a cylindrical insertion bore 74' and a polyhedral nut chamber 74 into which a separate threaded nut 70 having an internal thread 72 is non-rotatably inserted. The inner circle diameter of the nut chamber 74 is larger than the inner diameter of the cylindrical insertion bore 74'. The loose bearing cylinder bore 80, the two housing flange insertion bores 45, 47, the frame leg insertion bore 74' and the threaded nut 70 are exactly aligned with each other axially in the transverse direction, thus comprise a common axial.

In the present case, the loose bearing fastening element is defined by a loose bearing threaded bolt 60 which comprises a cylindrical bolt head 61, an adjoining threadless cylindrical bolt shaft 64 and, adjoining the latter, a threaded section 66 with an external thread 67. The external thread 67 of the threaded bolt corresponds to and is screwed into the internal thread 72 of the threaded nut. The loose bearing threaded bolt is inserted into the loose bearing cylinder bore 80 with the outer cylinder surface 63 of the bolt head 61, the outer diameter of which is larger than the outer diameter of the bolt shaft 64 and the threaded section 66, completely free of play and jammed to a certain extent.

A proximal bolt head annular step 61' is defined at the bolt head in the transition to the bolt shaft 64, which directly frictionally engages an opening edge 61" of the distal side of the loose bearing housing flange, as the bolt fastening threaded section 66 is tightly screwed to the corresponding internal thread 72 associated with the loose bearing frame leg 14. As a result, the fixed bearing frame leg 14 and the two housing flanges 44, 46 are pressed together in a sandwich-like manner, so that the fixed bearing housing flange 44 also rests directly against the fixed bearing frame leg 14 and is frictionally fixed thereto.

The bolt shaft 64 is inserted largely without play in the two housing flange insertion bores 45, 47 and in this way additionally holds the drive unit housing 22 in the drive receptacle 10.

The bolt head 61 bridges the virtually unavoidable tolerance gap D between the loose bearing frame leg 16 and the loose bearing housing flange 46. The bolt head 61 comprises a tool-receiving structure 62 in the form of an internal polygon for attaching a rotary wrench.

Assembly is accomplished by first axially aligning the two insertion bores 45, 47 of the drive unit 20 with the loose bearing cylinder bore 80 and the frame leg insertion bore 74'. Then, the loose bearing threaded bolt 60 is inserted into the loose bearing cylinder bore 80 and the insertion bores 45, 47 so that the threaded bolt threaded section 66 can be screwed into the corresponding internal thread 72 with the aid of the applied wrench until the bolt head annular step 61' abuts the opening edge 61" of the loose bearing housing flange 46. The threaded bolt 60 is tightened with a high torque so that the fixed bearing housing fastening 44 abuts directly and frictionally against the fixed bearing frame leg 14 and the bolt head ring step 61' also abuts directly and frictionally against the opening edge 61" of the loose bearing housing flange 46. In this assembly position, the bolt head 61 is inserted with most of its axial length in the loose bearing cylinder bore 80.

Figure 2:
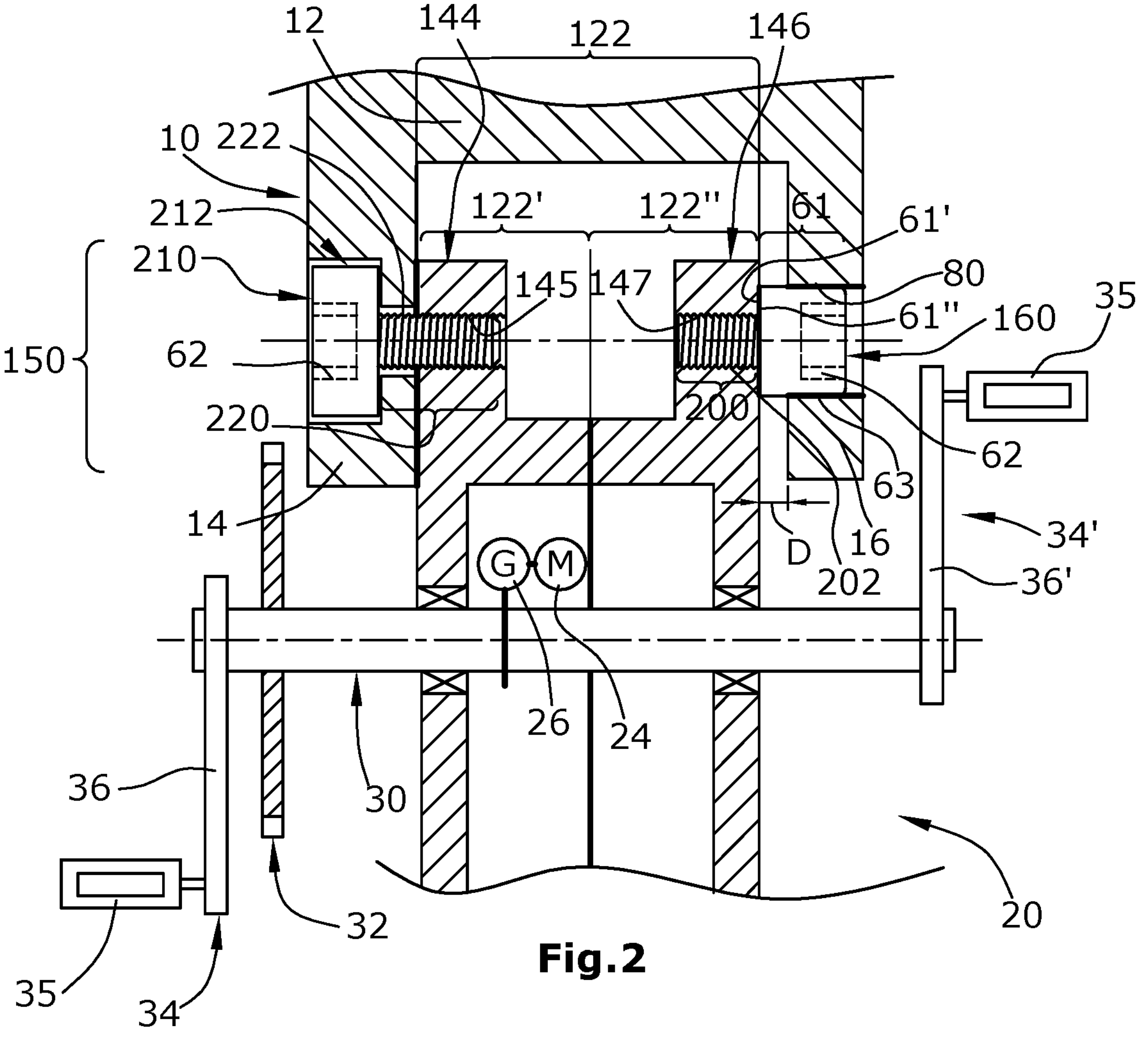
FIG. 2 is a schematic cross-section of a second embodiment of an electric bicycle drive unit mounting arrangement defined by a loose bearing threaded bolt and a separate fixed bearing threaded bolt.

In the second embodiment shown in FIG. 2, the loose bearing threaded bolt 160 provides only the loose bearing fastening, but not the fixed bearing fastening. The loose bearing housing flange 146 and the fixed bearing housing flange 144 are not configured to abut one another, but are spaced apart from one another and are attached to the respectively associated frame leg 16, 14 by separate fastening elements.

For this purpose, the loose bearing threaded bolt 160 comprises a threaded section 202 having an external thread 200 directly adjacent the bolt head 61 and threaded into a corresponding internal thread 140 in the loose bearing housing flange 146. The fixed bearing comprises a separate fixed bearing fastening element configured as a fixed bearing threaded bolt 210 having a bolt head 212 and a threaded portion 220 having an external thread 222, wherein the threaded portion 220 is threaded into a corresponding internal thread 145 in the fixed bearing housing flange 144. The fixed bearing threaded screw 210 is tightened to provide a force fit between the fixed bearing frame leg 14 and the fixed bearing housing flange 144.

What is claimed is:

1. An electric bicycle drive unit mounting arrangement for attaching an electric drive unit at a drive receptacle of a bicycle frame, wherein the bicycle frame comprises a fixed bearing fastening frame leg and a parallel loose bearing fastening frame leg, wherein a drive unit housing comprises a fixed bearing fastening housing flange and a parallel loose bearing housing flange, wherein the fixed bearing housing flange is frictionally attached directly against the fixed bearing frame leg, and wherein a loose bearing fastening element is provided for attaching the loose bearing housing flange to the loose bearing frame leg, wherein the loose bearing fastening element is configured as a loose bearing threaded bolt, which comprises a cylindrical bolt head, which is seated without radial play in a loose bearing cylinder bore of the loose bearing frame leg, and comprises a threaded portion with an external thread, which is screwed in a corresponding internal thread at the fixed bearing frame leg.

2. The electric bicycle drive unit mounting arrangement of claim 1, wherein the internal thread to which the threaded bolt threaded portion is threaded is associated with the fixed bearing frame leg.

3. The electric bicycle drive unit mounting arrangement of claim 2, wherein a separate threaded nut is non-rotatably mounted to the fixed bearing frame leg and comprises the internal thread associated with the fixed bearing frame leg.

4. The electric bicycle drive unit mounting arrangement of claim 1, wherein the two housing flanges respectively comprise a threadless insertion bore through which a bolt shaft of the loose bearing threaded bolt is inserted.

5. The electric bicycle drive unit mounting arrangement of claim 1, wherein the two housing flanges are in direct contact with each other.

6. The electric bicycle drive unit mounting arrangement of claim 1, wherein the outer diameter of the bolt head is greater than the outer diameter of the threaded portion and a proximal bolt head annular step directly abuts an opening edge of the loose bearing housing flange.

7. The electric bicycle drive unit mounting arrangement of claim 1, wherein the internal thread corresponding to the threaded bolt threaded portion is provided in the loose bearing housing flange.

8. The electric bicycle drive unit mounting arrangement of claim 7, wherein the fixed bearing housing flange is attached to the fixed bearing frame leg by a separate threaded bolt.

9. The electric bicycle drive unit mounting arrangement of claim 1, wherein the cylindrical bolt head comprises a tool-receiving structure for attachment of a rotary wrench, preferably configured as an internal polygon.

10. The electric bicycle drive unit mounting arrangement of claim 1, wherein the drive unit is a center motor, supports a pedal crankshaft and drives an output element located outside of the drive housing.

11. The electric bicycle drive unit mounting arrangement of claim 10, wherein the output element is disposed distally of the fixed bearing frame leg.

12. An electric bicycle drive unit mounting arrangement for attaching an electric drive unit at a drive receptacle of a bicycle frame, wherein the bicycle frame comprises a fixed bearing fastening frame leg and a parallel loose bearing fastening frame leg, wherein a drive unit housing comprises a fixed bearing fastening housing flange and a parallel loose bearing housing flange, wherein the fixed bearing housing flange is frictionally attached directly against the fixed bearing frame leg, and wherein a loose bearing fastening element is provided for attaching the loose bearing housing flange to the loose bearing frame leg, wherein the loose bearing fastening element is configured as a loose bearing threaded bolt, which comprises a cylindrical bolt head, which is seated without radial play in a loose bearing cylinder bore of the loose bearing frame leg, and comprises a threaded portion with an external thread, which is screwed in a corresponding internal thread at one of the housing flanges.

13. The electric bicycle drive unit mounting arrangement of claim 1, wherein the cylindrical bolt head is seated with a tight fit in the loose bearing cylinder bore of the loose bearing frame leg.

14. The electric bicycle drive unit mounting arrangement of claim 12, wherein the cylindrical bolt head is seated with a tight fit in the loose bearing cylinder bore of the loose bearing frame leg.

* * * * *